INVENTOR.
JOHN R. DURIO JR.
BY Moody and Phillips
ATTORNEYS

Aug. 31, 1965 J. R. DURIO, JR 3,204,124

MEANS FOR PRODUCING CLOCK PULSES WHOSE WIDTHS VARY AS THEIR REPETITION RATE

Filed March 18, 1963 2 Sheets-Sheet 2

INVENTOR.
JOHN R. DURIO JR.

BY Moody and Phillips
ATTORNEYS

United States Patent Office 3,204,124
Patented Aug. 31, 1965

3,204,124

MEANS FOR PRODUCING CLOCK PULSES WHOSE WIDTHS VARY AS THEIR REPETITION RATE

John R. Durio, Jr., Costa Mesa, Calif., asignor to Collins Radio Company, Cedar Rapids, Iowa, a corporation of Iowa Filed Mar. 18, 1963, Ser. No. 265,825
6 Claims. (Cl. 307—88.5)

This invention relates, generally, to pulse generating circuits and, more particularly, to a pulse generating circuit which generates pulses whose widths increase or decrease in accordance with an increase or decrease of the repetition rate of said pulses.

In certain applications there is a need for a pulse generator which will generate pulses whose widths vary as the repetition rate. Although prior art circuits exist which will produce pulses whose widths do vary as their repetition rate, such circuits are generally complex and relatively expensive.

A primary object of the present invention is to provide a simple electronic circuit which will produce output pulses whose widths increase or decrease in accordance with the increase or decrease of the repetition rate.

Another object is the improvement of pulse generators, generally.

In accordance with the invention, there is provided a one-shot multivibrator circuit which includes a normally conductive transistor and a normally conductive transistor with the base electrodes and collector electrodes of the two transistors being cross-connected in conventional manner through coupling capacitor means. Means are provided to supply an input signal, consisting of a series of pulses which may be of variable repetition rate, to the base of the normally nonconductive transistor, to cause the multivibrator to cycle once in response to each input pulse. Cycling of the multivibrator involves the steps of causing the normally nonconductive transistor to become conductive and supplying the resultant change of collector electrode potential thereof through the coupling capacitor means to the base of the normally conductive transistor to extinguish said normally conductive transistor. After a short interval of time the coupling capacitor means will charge to cause the normally conductive transistor to again become conductive and the normally nonconductive transistor to become nonconductive. In such one-shot multivibrator circuits the time interval of a complete cycle is determined largely by the time required for the aforementioned coupling capacitor to charge to a point where the normally conductive transistor again becomes conductive. Such charging time is determined by the RC time constant and also the magnitude of the D.-C. voltage supplying the charging current to the coupling capacitor. In the present invention a second circuit means, connected in parallel with the multivibrator with respect to the input signal, is constructed to respond to the input signal to produce a D.-C. voltage whose magnitude varies substantially proportionally to the repetition rate of the supplied input signal pulses. Such D.-C. voltage is employed to supply the charging current to the aforementioned coupling capacitor of the multivibrator circuit. Thus the duty cycle of the multivibrator circuit is determined by the repetition rate of the supplied input pulses and, consequently, will produce output pulses whose widths vary as the repetition rate of the received input pulses.

The above-mentioned and other objects and features of the invention will be more fully understood from the following detailed description thereof when read in conjunction with the drawings in which.

Referring to the circuit of FIG. 1, a generalized description of the structure shown therein will be given first, followed by a more detailed description with reference to the curves of FIGS. 2 through 5.

Figure 1:
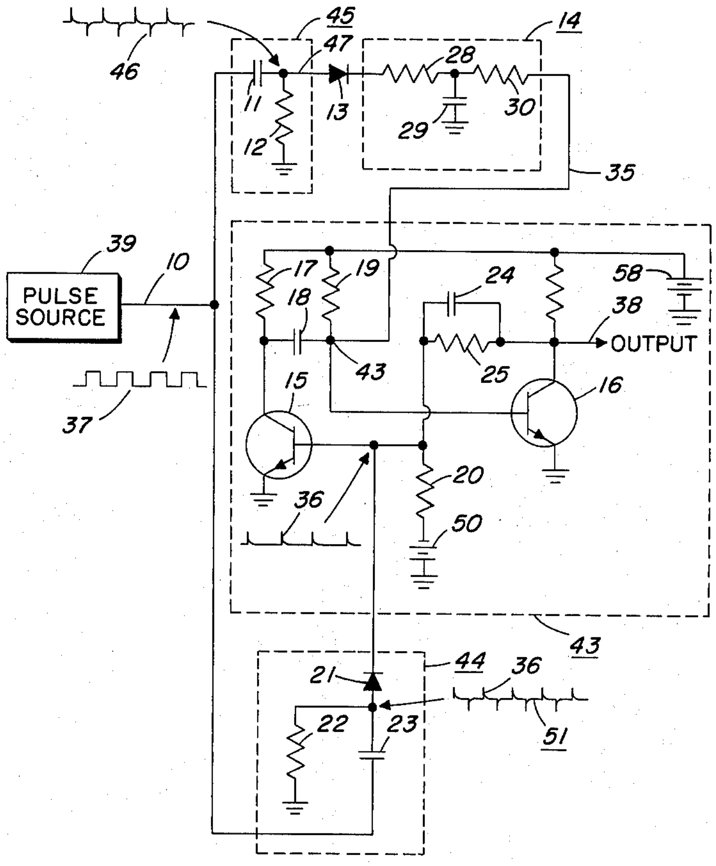
FIG. 1 shows a schematic diagram of the invention.

In FIG. 1 the input pulse source 39 is constructed to produce a train of pulses as representated by the pulse train 37, each pulse of which can have the same width, or be of different width, regardless of the repetition rate. A differentiating circuit 44 transforms the pulses of train 37 into positive and negative spikes as shown in waveform 51. Diode 21 functions to pass only the positive pulses 36 of waveform 51 to the one-shot multivibrator 43 which is comprised of normally nonconductive transistor 15 and normally conductive transistor 16. The general operation of multivibrator 43 is conventional, with the collector electrodes and base electrodes of the two transistors 15 and 16 being cross-connected through coupling capacitors 18 and 24.

The normally nonconductive transistor 15 responds to each positive input pulse supplied thereto from diode 21 to become conductive, thus causing the normally conductive transistor 16 to become nonconductive owing to the negative pulse supplied to the base of transistor 16 through coupling capacitor 18 from the collector of transistor 15. Normally conductive transistor 16 will remain nonconductive until the right-hand plate of coupling capacitor 18 charges to a positive potential sufficient to cause transistor 16 to again become conductive. When the transistor 16 does become conductive again, the transistor 15 will become nonconductive owing to the negative pulse supplied from the collector of transistor 16 to the base of transistor 15 through coupling capacitor 24.

The cycle time of the one-shot multivibrator 43 is determined primarily by the time interval required for the coupling capacitor 18 to charge positively to a potential sufficient to cause transistor 16 to again become conductive. Obviously, the higher the reference voltage towards which the right-hand plate of coupling capacitor 18 is charging, the faster the right-hand plate of coupling capacitor 18 will charge to the potential necessary to cause the transistor 16 to become conductive. The said reference potential towards which the capacitor 18 is charging appears on the lead 35 and is produced by the operation of the differentiating circuit 45, diode 13, and D.-C. filter 14, all of which function to transform the input pulses from source 39 into a D.-C. voltage whose magnitude is proportional to the repetition rate of said input pulses.

In the operation of the circuit means for producing the D.-C. reference voltage, the output pulses 37 from source 39 are supplied to differentiating circuit 45, which is comprised of capacitor 11 and resistor 12, to produce at point 47 a series of alternately occurring positive and negative spikes, as shown by waveform 46. Rectifier 13 passes only the positive spikes, rejecting the negative ones. In response to the positive pulses passed by rectifier 13, the D.-C. filter 14, comprised of resistors 28 and 30 and capacitor 29, produces a D.-C. voltage whose magnitude varies proportionally to the repetition rate of said positive spikes. Since the repetition rate of the positive spikes is the same as the repetition rate of the pulses from source 39 (and independent of the pulse width of the pulses from source 39), the D.-C. voltage produced at the output of the D.-C. filter 14 is proportional to the repetition rate of the pulses from source 39.

Figures 2, 3, 4, 5:
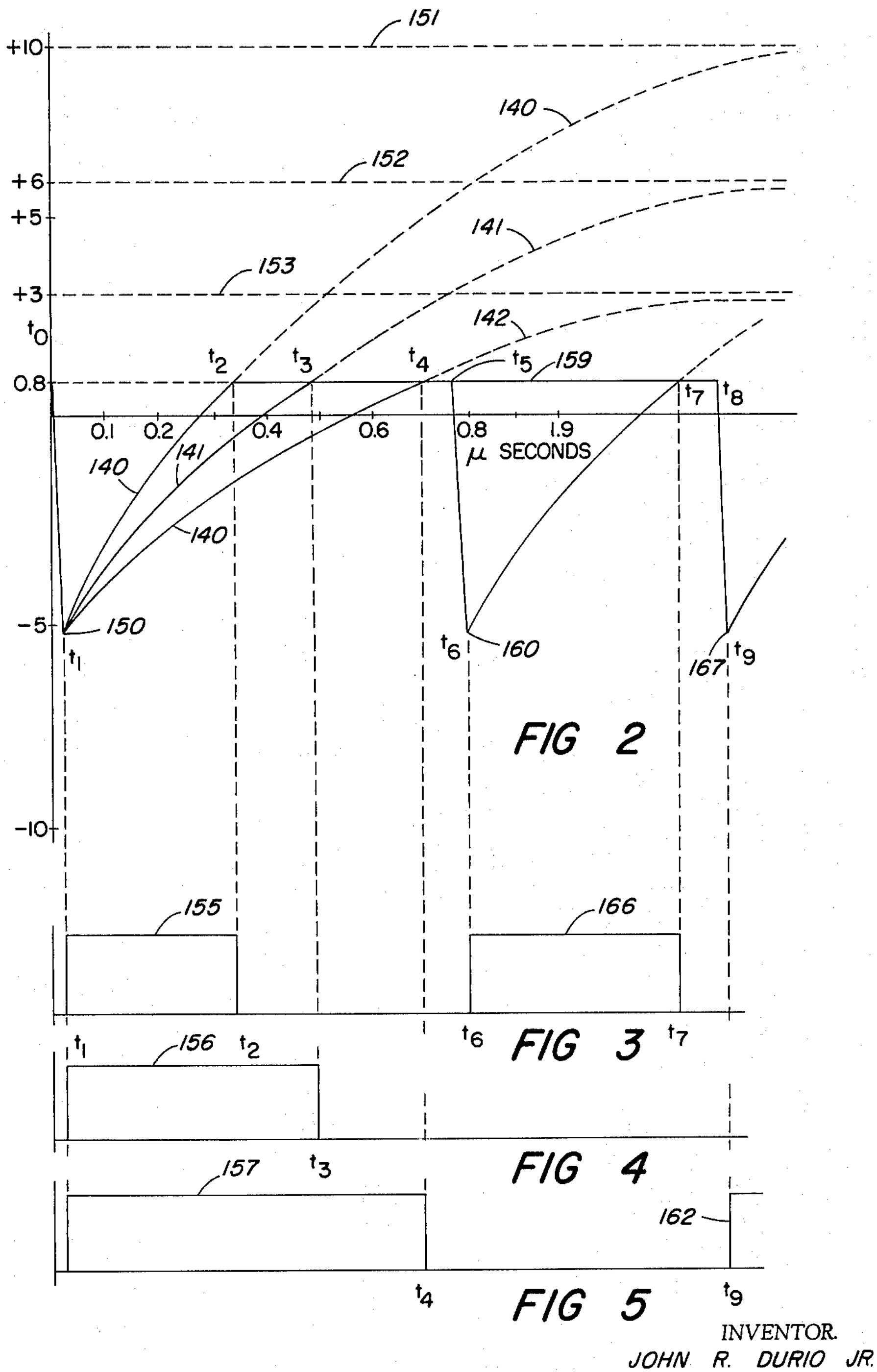
FIG. 2 shows curves illustrating the different cycling times of the multivibrator circuit when input signals of different repetition rates are supplied to the multivibrator.
FIGS. 3, 4, and 5 show the output pulses produced by the circuit in response to input pulse signals of different repetition rates.

In the curves of FIG. 2 there are shown three arbitrary levels of D.-C. reference voltage which might be produced at the output of filter 14. Such D.-C. levels are shown as being +3 volts, +6 volts, and +10 volts. It is to be understood that these three levels of D.-C. voltages are produced as the result of different repetition rates of input pulses from source 39. The curves 140, 141, and 142 represent the recovery rates of the coupling capacitor 18 of the multivibrator 43 for the +10, +6, and +3 volt D.-C. reference voltages, respectively, and will be discussed in the following paragraphs.

As discussed above, when transistor 15 becomes conductive a negative pulse will be impressed on the base of transistor 16 through coupling capacitor 18, thus turning off normally conductive transistor 16. Immediately, the right-hand plate of transistor 18, now negative with respect to ground will begin to charge towards the potential of junction 43, which potential is determined by the net positive charge on capacitor 29, the magnitude of battery source 58, and the values of resistors 30 and 19. However, for purpose of convenience of expression, the potential of the junction 43 sometimes will be referred to as being determined solely by the charge on capacitor 29. The time interval required for capacitor 18 to charge sufficiently positive to turn on transistor 16 is determined by the RC time constant of its charging paths and, particularly, the charge on capacitor 18.

In FIG. 2 the curves 140, 141, and 142 specifically represent the voltage on the right-hand plate of coupling capacitor 18 starting at time $t_0$ when normally "off" transistor 15 receives a positive pulse on its base electrode to become conductive. At time $t_1$ the negative-going collector electrode of transistor 15 produces the most negative excursion of the right-hand of coupling capacitor 18; such most negative excursion of the right-hand plate of coupling capacitor 18; such most negative excursion being represented by point 150 on the curve FIG. 2. Beginning at time $t_1$, the right-hand plate of capacitor 18 charges positively towards the net voltage of junction 43 which, as indicated above, is determined by the charge on capacitor 29, and the values of battery source 58, resistor 30 and resistor 19. Assume that an input pulse signal of repetition rate $f_1$ has produced a +10 volt potential on lead 35 (junction 43). Thus, the right-hand plate of coupling capacitor 18 will charge in accordance with the curve 140 of FIG. 2 towards the +10 volt level 151. However, capacitor 18 will not be able to charge beyond +0.8 volt since transistor 16 will become conductive at this level. More specifically, when transistor 16 becomes conductive the potential on the right-hand plate of capacitor 18 will be clamped to +0.8 volt due to the diode action of the base and emitter electrodes of transistor 16. The recovery time of capacitor 18, measured from time $t_0$ until transistor 16 again becomes conductive at time $t_2$, is about .33 microseconds, as can be seen from FIG. 2. It is to be noted that the dotted portion of the curve 140 does not represent an actual occurrence in the circuit. In actual operation the curve 140 breaks sharply at time $t_2$ and follows the straight line curve 159 of FIG. 2, which is at the +0.8 volt level.

As the result of the above cycle of operation, the output pulse 155 of FIG. 3 is produced at the collector electrode of transistor 16, from which the output signal is taken via output lead 38. The pulse 155 begins at time $t_1$ and terminates at time $t_2$.

Assume the next pulse, also of repetition rate $f_1$, is received from pulse source 39 at time $t_5$. The transistor 15 will again become conductive and coupling capacitor 18 will acquire its maximum negative potential at time $t_6$ represented by point 160 of FIG. 2. Recovery of capacitor 18 will reach the +0.8 volt level at time $t_7$ when transistor 16 will return to its normal conductive state. Thus the second output pulse 166 of FIG. 3 is produced at the collector electrode of transistor 16.

Assume another case wherein the charge on capacitor 29 of filter 14 is a +3.0 volts, caused by an input signal of repetition rate $f_2$. Under such circumstances, after transistor 15 has become conductive, and the right-hand plate of coupling capacitor 18 has dropped below ground potential to the low point 150 of FIG. 2, the charging of capacitor 18 will follow the curve 142 towards the maximum recovery voltage of +3.0 volts. However, when capacitor 18 charges to +0.8 volts at time $t_4$, transistor 16 will again become conductive to complete the cycle. The time interval between turn-off and turn-on of transistor 16 is about 0.70 microsecond, which is about twice the amount of time required when the reference voltage was 10 volts, as discussed in the case of curve 140. The pulse produced at the collector electrode of transistor 16 is shown as pulse 157 in FIG. 5 and occupies a time interval $t_1$–$t_4$.

Assume that at time $t_8$ the next input pulse of repetition rate $f_2$ occurs to cause capacitor 18 to become negatively charged to point 167 (time $t_9$), when recovery begins. In such a manner output pulse 162 of FIG. 5 is initiated.

When the reference voltage is +6.0 volts, as represented by level 152 of FIG. 2, the off-time of transistor 16 is about 0.48 microsecond, as shown by curve 141. It is to be understood that the three curves 140, 141, and 142 all become curve 159 when +0.8 volt is reached.

Since the output signal of the circuit is taken from the collector electrode of transistor 16, the length of the output pulses is measured by the time interval that transistor 16 is cut off. In turn, the cut-off time interval of transistor 16 is proportional to the repetition rate of the input pulses. Thus, the output signal appearing on output lead 38 is proportional to the repetition rate of the input signal pulses supplied from input source 39.

In FIG. 1 NPN type transistors are shown. However, multivibrators using other types of electron valves also can be employed. For example, PNP type transistors can be used if certain other changes are made in the circuit. Specifically, the polarity of diodes 13 and 21 would be reversed, as would be the polarities of biasing battery source 50 and the battery source 58. Further, vacuum tubes can be used in lieu of transistors. In addition to the changes just set forth, other changes in circuit design and arrangement can be made without departing from the spirit or scope of the invention.

I claim:

1. Pulse generating circuit means comprising:
- an input pulse source,
- first circuit means constructed to respond to the pulses from said input pulse source to produce a D.-C. voltage whose magnitude varies as the frequency of the input pulses,
- and second circuit means connected in parallel with said first circuit means with respect to said input pulse source and including a one-shot multivibrator constructed to respond to each input pulse to complete a cycle of operation,
- said second circuit means further constructed to vary its operating cycle time in response to the magnitude of the said D.-C. voltage produced by said first circuit means, and to produce output signal pulses whose time length is determined by the said operating cycle time of said multivibrator.

2. Pulse generating circuit means in accordance with claim 1 in which said one-shot multivibrator comprises:
- first electron valve means normally quiescent and second electron valve means normally conductive,
- each of said electron valve means having an electron collecting electrode and an electron control electrode,
- and capacitive coupling means connecting the electron collecting electrode of said first electron valve to the electron control electrode of said second electron valve, and comprising means for supplying said D.-C. voltage between said capacitive coupling means and the control electrode of said second electron valve.

3. A pulse generator circuit in accordance with claim 1 in which said first circuit means comprises:
differentiating and rectifying circuit means for producing pulses of constant energy content in response to pulses from said input pulse source,
and integrating means responsive to said constant energy pulses for producing said D.-C. voltage whose magnitude varies as the repetition rate of said input pulses.

4. A pulse generating circuit comprising:
an input pulse source, first circuit means constructed to respond to the pulses from said input pulse source to produce a D.-C. voltage whose magnitude varies as the repetition rate of said input pulses,
and second circuit comprising a bistable device having a first stable state and a second stable state and constructed to respond to a pulse from said input pulse source to change from its first stable state to its second stable state, and then after a predetermined time interval to change back to its first stable state,
said first and second circuit means being connected substantially in parallel with each other with respect to said input pulse source,
said bistable device being further constructed to respond to said D.-C. voltage to vary said predetermined time interval in accordance with variations of the magnitude of said D.-C. voltage, and to produce output pulses whose lengths vary as the said predetermined time interval.

5. A pulse generating circuit in accordance with claim 4 in which said bistable device comprises:
first electron valve means normally quiescent and second electron valve means normally conductive,
each of said electron valve means having an electron collecting electrode and an electron control electrode,
and capacitive coupling means connecting the electron collecting electrode of said first electron valve to the electron control electrode of said second electron valve,
and comprising means for supplying said D.-C. voltage between said capacitive coupling means and the control electrode of said second electron valve.

6. A pulse generator circuit in accordance with claim 4 in which said first circuit means comprises:
differentiating and rectifying circuit means for producing pulses of constant energy content in response to pulses from said input pulse source,
and integrating means responsive to said constant energy pulses for producing said D.-C. voltage whose magnitude varies as the repetition rate of said input pulses.

References Cited by the Examiner

UNITED STATES PATENTS 3,021,488 2/62 Edson ---------------- 328—140

ARTHUR GAUSS, *Primary Examiner.*